United States Patent [19]
Wright

[11] Patent Number: 5,198,733
[45] Date of Patent: Mar. 30, 1993

[54] STARTING A BRUSHLESS DC MOTOR

[75] Inventor: Laurence M. Wright, Southampton, Great Britain

[73] Assignee: International Business Machines Corporation, Armonk, N.Y.

[21] Appl. No.: 602,239

[22] PCT Filed: Mar. 15, 1989

[86] PCT No.: PCT/GB89/00266

§ 371 Date: Nov. 13, 1990

§ 102(e) Date: Nov. 13, 1990

[87] PCT Pub. No.: WO90/10973

PCT Pub. Date: Sep. 20, 1990

[51] Int. Cl.[5] .............................................. H02P 7/00
[52] U.S. Cl. ...................................... 318/254; 318/138; 318/439; 318/778
[58] Field of Search ......... 318/254, 138, 439, 778-780

[56] References Cited

U.S. PATENT DOCUMENTS

| | | | |
|---|---|---|---|
| 3,916,274 | 10/1975 | Lewis | 318/787 |
| 4,168,457 | 9/1979 | Rose | 318/561 |
| 4,292,573 | 9/1981 | Ebert et al. | 318/138 |
| 4,455,513 | 6/1984 | Fulton et al. | 318/254 |
| 4,480,279 | 10/1984 | Hashimoto | 318/561 X |
| 4,521,724 | 6/1985 | Sakamoto et al. | 318/757 X |
| 4,629,960 | 12/1986 | Welsh et al. | 318/729 |
| 4,710,687 | 12/1987 | Kanda | 318/561 |
| 4,876,491 | 10/1989 | Squires et al. | 318/254 X |
| 4,922,169 | 5/1990 | Freeman | 318/254 |
| 4,978,895 | 12/1990 | Schwarz | 318/254 |
| 5,012,166 | 4/1991 | Ushijima et al. | 318/254 |
| 5,017,895 | 5/1991 | Carobolante et al. | 318/254 X |

FOREIGN PATENT DOCUMENTS 251785 1/1987 European Pat. Off.
3209394 5/1984 Fed. Rep. of Germany.

OTHER PUBLICATIONS

Design Engineering, Microprocessor Drive System, Oct. 1984, p. 37.

Primary Examiner—William M. Shoop, Jr.
Assistant Examiner—David Martin
Attorney, Agent, or Firm—Robert W. Lathtinen; Richard E. Billion

[57] ABSTRACT

A brushless DC motor is started by initially specifying an arbitrary rotor position and applying such drive currents to the three motor phase inputs that the rotor moves to the predetermined position and thereafter applying a current pulse to the appropriate winding to cause the rotor to move in the desired rotational direction. After the motor has begun to turn, the current supply to the motor phase inputs is interrupted. The current in the motor is allowed to decay to a level where the I and R voltage drops in the windings are substantially less than the back EMFs at the speed at which the motor is turning. The small back EMFs generated in the windings are sampled and monitored to detect whether the rotor has moved to a position requiring a change in commutation. Drive current is supplied to the three motor phase inputs in accordance with whether or not a need for a change in commutation was detected by the sample so that the rotor will continue to turn in the required direction. The current interruption and sampling are repeated at a rate greater then the commutation rate (i.e. more frequently as the motor speed increases) and at a rate directly proportional to the speed of the motor to determine the current position of the rotor from the sampled back EMFs. When the back EMFs are significantly greater than the IR losses in the windings, current is supplied to the motor phase inputs (i.e. commutate) in dependence on the current position of the rotor as determined by the continuous comparison of the back EMFs.

4 Claims, 1 Drawing Sheet

STARTING A BRUSHLESS DC MOTOR

TECHNICAL FIELD OF THE INVENTION

This invention relates to a method of starting a brushless direct current motor and to a drive arrangement including such a motor.

BACKGROUND OF THE INVENTION

In the past, most brushless DC motors used dedicated sensors such as Hall effect devices or optical sensors to determine the angular position of the rotor with respect to the stator. This information was then used to commutate the motor. More recently, the back EMF signals from the stator coils of the motor have been used to sense the angular position of the rotor with the advantages of reducing commutation timing errors and costs. However, when the motor is stationary there is no back EMF from the stator coils and so a special start system is required. This system is also required at low speeds as the drive currents cause voltages that can be much greater than the back EMF signals making their detection a problem.

Design Engineering October 1984, page 37 discloses a back EMF position sensing system for brushless DC motors. This article is not clear as to the details of the starting system used but describes a technique which only allows energisation of the motor coils during particular time periods which is incompatible with many applications.

EP-A-251785 discloses a method of producing feedback information concerning the rotational position of the rotor of a brushless dc motor without using sensing devices in the structure of the motor, when the motor is at a standstill or rotating only slowly. The phases of the motor are energised under the control of a microprocessor and current through the phases is monitored by the microprocessor. Periodically, from standstill to a first rotational speed, each of the set of motor phases is momentarily energised in sequence and the amplitude of the short current pulse that flows in each phase is monitored. The phase in which the highest current pulse flows indicates the position of the rotor. The momentary energisation of the set of phases is insufficient to generate sufficient torque to turn the rotor: each momentary energisation of the set of phases is followed by sustained torque-producing energisation of the particular phase which is appropriate to the rotor position indicated by the monitored current pulses which flowed in response to the momentary energisation. Monitoring the amplitudes of the short current pulses requires the use of an analogue-to-digital converter. Accordingly, the method disclosed in EP-A-251785 has the disadvantage of either restricting the choice of the microprocessor to one with an integral analogue-to-digital converter or requiring the use of a separate analogue-to-digital converter which would be accompanied by extra cost, power consumption and lower system reliability.

DE-C2-32 09 394 discloses a system of controlling a brushless DC motor in order to get the motor turning in the desired direction as soon as possible. With the motor at a standstill, a current pulse is applied to one of the windings and then the back EMFs in the windings are examined to determine whether the motor has begun to turn in the desired direction. If it has, the system runs the motor in a self-commutating mode. If the motor has begun to turn in the undesired direction, the system causes the windings to be energised so that the motor changes its direction of rotation. The system disclosed in this prior document is suitable where a load is not applied until the motor has reached its operating speed but is not applicable to an arrangement where the motor has a high starting load, such as in a record disk file drive.

The invention seeks to provide an improved method of starting a brushless direct current motor, particularly one having a high starting load such as one driving a record disk file.

DISCLOSURE OF THE INVENTION

The invention provides a method of starting a brushless direct current motor including the successive steps of (a) energising the motor windings to move the rotor to a predetermined position; (b) applying a drive current pulse to the appropriate winding phase to cause the rotor to turn from the predetermined position in a predetermined direction of rotation; (c) sampling the back EMFs generated in the winding phases when the current pulse has decayed to a level where the $I \times R$ voltage drops in the windings are substantially less than the back EMFs in order to indicate whether a change in commutation is required to keep the rotor turning in the predetermined direction; and (d) applying a drive current pulse to the appropriate winding phase in response to the indication provided by step (c) to keep the rotor turning in the predetermined direction.

The invention also provides a drive arrangement including a brushless direct current motor; means to energise the motor windings to move the rotor to a predetermined position; means to apply a drive current pulse to the appropriate winding phase to cause the rotor to turn from the predetermined position in a predetermined direction of rotation; sampling means to sample the back EMFs generated in the winding phases when the current pulse has decayed to a level where the $I \times R$ voltage drops in the windings are substantially less than the back EMFs in order to indicate whether a change in commucation is required to keep the rotor turning in the predetermined direction; and means to apply a drive current pulse to the appropriate winding phase in response to the indication provided by the sampling means to keep the rotor turning in the predetermined direction.

BRIEF DESCRIPTION OF THE DRAWING

How the invention can be carried out will now be described by way of example, with reference to the accompanying drawing which is a diagram of a brushless DC motor and apparatus for controlling its start-up and running.

DETAILED DESCRIPTION OF THE INVENTION

Figure 1:
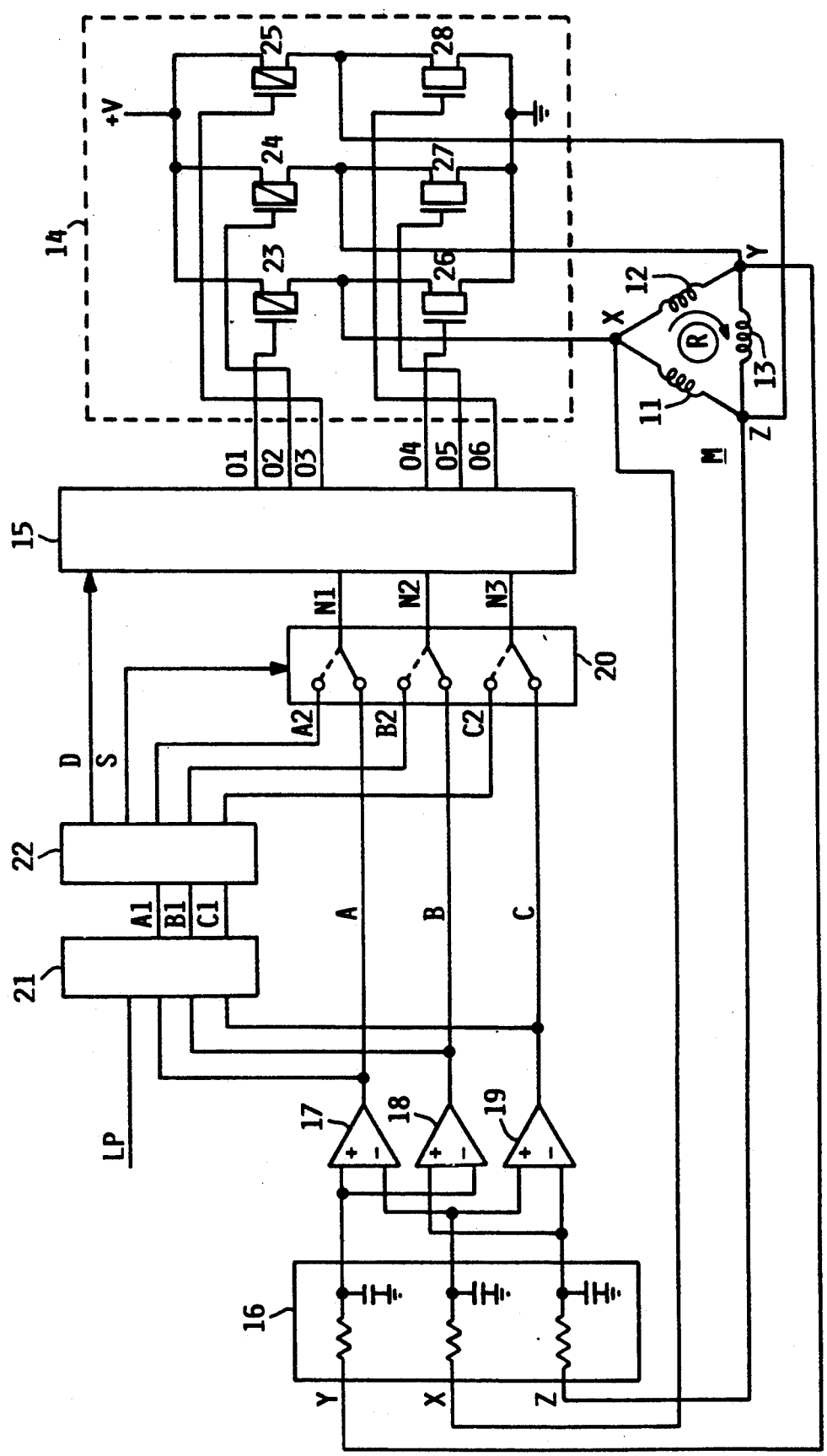

An electronically commutated DC motor M has an 8 pole permanent magnet rotor R made of a rare earth magnetic material, such as neodymium/iron/boron. The stator windings 11, 12, 13 of the motor M are connected in the delta configuration to provide three phases X, Y and Z which are energised from a voltage supply +V by electronic switching circuitry 14. A controller 15 controls the commutation and speed of the motor M by supplying signals on six output lines 01 to 06 to the switching circuitry 14. Rotation of rotor R of the motor M induces back EMFs in the windings 11, 12, 13 and hence in the phases X, Y and Z. The phases X, Y and Z are connected to low pass filter circuitry 16 to separate out the back EMFs. The time constant of the low pass filters in the circuitry 16 should be large enough to filter out switching noise from the motor drive circuits and should be chosen such that the phase A, B and C (with respect to the rotor position) are correct at the required operating speed of the motor. Appropriate pairs of the separated out back EMFs are compared by three comparators 17, 18 and 19 to produce outputs A, B and C which together provide an indication of the position of the rotor R all the time that the back EMFs are greater than the I×R voltage drops in the windings. The comparators 17, 18 and 19 must be such that they function with inputs down to zero volts, and they can be comprised in a standard quad comparator package, such as the LM 339 package marketed by National Semiconductor Corporation. When the motor is running at a speed greater than a predetermined minimum speed, the switching means 20 is set as shown in the drawing and the outputs A, B and C are passed onto inputs N1, N2 and N3 of the controller 15. In this case the controller 15 generates signals on output lines 01 to 06 in accordance with the rotor position indicated by the outputs A, B and C in an analogous manner to that in which commutation signals are produced by the commutation logic conventionally used with motors employing three Hall effect sensors to determine the angular position of the rotor.

The outputs A, B and C are also supplied as inputs to a 3-bit register 21 which samples them on receipt of a load pulse LP and produces outputs A1, B1 and C1 which together represent the position of the rotor at the sampling instant defined by load pulse LP. The outputs A1, B1 and C1 are applied to a digital signal processor (DSP) 22 which generates therefrom output signals A2, B2 and C2 which are such as to control the driving of the motor in the required direction from the sampled rotor position. The output signals A2, B2 and C2 are applied to inputs N1, N2 and N3 of the controller 15 when the switching means 20 is set in the opposite position to that shown in the drawing. The position of switching means 20 is determined by a signal S generated by the DSP 22. The load pulse LP applied to the 3-bit register 21 can either be generated by the DSP 22 or it can be provided by a pulse train having a predetermined period. The DSP 22 also generates a disable current signal D which when applied to the controller 15 prevents the switching circuitry 14 from supplying any current to the windings X, Y and Z. The switching circuitry 14 comprises three P-type FETs 23, 24 and 25 and three N-type FETs 26, 27 and 28. FETs 23 and 26 are connected in series between the voltage supply +V and ground and the junction between FETs 23 and 26 is connected to the X phase input of the motor M. The output line 01 of the controller 15 is connected to the gate of FET 23 and the output line 04 to the gate of FET 26. In a similar manner, the FETs 24 and 27 are connected in series between the voltage supply +V and ground, and to the Y phase input of the motor and to the output lines 02 and 05 of the controller 15. The FETs 25 and 28 are similarly connected to the Z phase input of the motor and the outputs 03 and 06 of the controller 15.

To start the motor M, the DSP 22 supplies the signal S continuously to the switching means 20 to set the switches therein to the opposite positions to those shown in the drawing and supplies signals on the outputs A2, B2 and C2 which are such that the controller 15 responds thereto to cause the motor phases to be energised in an initial predetermined sequence to cause the rotor to move from its rest position to an arbitrary predetermined position. The current supplied to the motor phases is steadily increased during this initial period of energisation in order to prevent overshoot. When the rotor has assumed the predetermined position, the DSP 22 causes the controller 15 to apply a current pulse to the motor phases in such a sense and sufficiently long that the rotor will turn in the predetermined direction from its predetermined position. After a time interval sufficiently long that the rotor has begun to turn in response to energisation of the motor phases, the DSP 22 supplies the disable signal D to the controller 15 causing the currents in the motor windings to decay. After a time sufficiently long that the currents in the motor windings have decayed substantially to zero, the load pulse LP is applied to the 3-bit register 21 which then samples the outputs A, B and C of the comparators 17, 18 and 19. The sampled outputs A1, B1 and C1 are passed onto the DSP 22 which determines therefrom the position of the rotor and generates output signals A2, B2 and C2 which will make the rotor turn in the desired direction. Simultaneously, the DSP 22 turns off the disable signal D thus allowing the controller 15 to respond to the signals A2, B2 and C2 and to supply signals on its outputs 01 to 06 such as to cause the appropriate phase of the motor to be energised to turn the rotor in the desired direction. After an interval, the DSP 22 again supplies the disable signal D to the controller 15, thus causing the currents in the motor windings to decay. When they have decayed to a level such that the back EMFs are greater than the I×R losses, the load pulse LP is again applied to the 3-bit register 21 to sample the outputs A, B and C of the comparators. The sampled outputs are passed onto the DSP 22 and once again it turns off the disable signal D allowing the controller 15 to energise the appropriate phase of the motor. This process is repeated at a rate directly proportional to the speed of the rotor until the back EMFs are significantly greater than the I×R losses in the windings (without the need to disable their energisation). During this period, the back EMFs are sampled at a rate greater than the commutation rate, the commutation rate being continuously monitored by the DSP 22.

Periodically, for example after every sixth sampling of the back EMFs, the DSP 22 determines the actual position of the rotor from the sampled back EMFs. On receipt of the other samplings of the back EMFs, the DSP 22 simply determines whether a change in rotor position requiring a change in commutation has occurred. If such a change in rotor position has occurred, the DSP 22 causes the application of the next commutation phase that is appropriate for torque generation in the desired direction of rotation. This ensures that the motor will only start to run in the intended direction.

When the rotor is turning at a speed such that the back EMFs are significantly greater than the IR losses in the windings, the DSP 22 cuts off the signal S, thus setting the switches in the switching circuitry 20 to the positions shown in the drawing. Thereafter, the outputs A, B and C of the comparators 17, 18 and 19 are passed to the inputs N1, N2 and N3 of the controller 15 and the disable signal D remains off while the motor continues to run. Under the control of the controller 15, the speed of the motor is built up to the desired speed and then the desired speed is maintained.

Although the invention has been described in connection with the motor having its windings connected in the delta configuration, it could be applied to a motor having star-connected windings.

To summarise, there has been described herein a method of starting a brushless dc motor which comprises the following basic steps:

1. Specify an arbitary rotor position and apply such drive currents to the three motor phase inputs that the rotor moves to the arbitrary rotor position.
2. Apply a current pulse to the appropriate winding such that the rotor moves in the desired direction of rotation.
3. After the motor has begun to turn, stop the current supply to the motor phase inputs.
4. Allow the current in the motor to decay to a level where the I×R voltage drops in the windings are substantially less than the back EMFs at the speed the motor is turning at.
5. Sample the (very small) back EMFs generated in the windings.
6. Monitor the sampled back EMFs to detect whether the rotor has moved to a position requiring a change in commutation.
7. Supply drive current to the three motor phase inputs in accordance with whether or not a need for a change in commutation was detected in step 5 and so that the rotor will continue to turn in the required direction.
8. Repeat steps 4 to 7 a predetermined number of times at a rate greater than the commutation rate (i.e. more frequently as the motor speed increases) and at a rate directly proportional to the speed of the motor.
9. Repeat steps 4 and 5.
10. Determine the current position of the rotor from the sampled back EMFs.
11. Supply such current to the three motor phase inputs that will cause the motor to turn in the required direction from the current position.
12. Repeat steps 4 to 11 until the back EMF voltages are significantly greater than the IR losses in the windings.
13. When the back EMFs are significantly greater than the IR losses in the windings, supply current to the motor phase inputs (i.e. commutate) in dependence on the current position of the rotor as determined by continuous comparison of the back EMFs.

I claim:

1. A method of starting a brushless direct current motor (M), including the successive steps of
   (a) energising the motor windings (X, Y, Z) to move the rotor to a predetermined position;
   (b) applying a drive current pulse to the appropriate winding phase to cause the rotor to turn from the predetermined position in a predetermined direction of rotation;
   (c) sampling the back EMFs generated in the motor windings (X, Y, Z) when the current pulse has decayed to a level where the I×R voltage drops in the motor windings are substantially less than the back EMFs in order to indicate whether a change in commutation is required to keep the rotor turning in the predetermined direction; and
   (d) applying a drive current pulse to the appropriate winding phase in response to the indication provided by step (c) to keep the rotor turning in the predetermined direction.

2. A method as claimed in claim 1, further including the steps of:
   (e) determining the rotor position from the sampled back EMFs; and
   (f) applying a drive current pulse to the appropriate winding phase to turn the rotor in the predetermined direction from the rotor position determined in step (e).

3. A method as claimed in claim 2, further comprising repeating steps (e) to (f) until the motor reached a speed at which the back EMFs are significantly greater than the IR losses in the windings and then commutating the motor in dependence on the current position of the rotor as indicated by continuous comparison of the back EMFs generated in the windings.

4. A drive arrangement including a brushless direct current motor (M);
   means to energise the motor windings (X, Y, Z) to move the rotor to a predetermined position;
   means to apply a drive current pulse to the appropriate winding phase to cause the rotor to turn from the predetermined position in a predetermined direction of rotation;
   sampling means to sample the back EMFs generated in the motor windings (X, Y, Z) when the current pulse has decayed to a level where the I×R voltage drops in the windings are substantially less than the back EMFs in order to indicate whether a change in commutation is required to keep the rotor turning in the predetermined direction; and
   means to apply a drive current pulse to the appropriate winding phase in response to the indication provided by the sampling means to keep the rotor turning in the predetermined direction.

* * * * *